United States Patent
Rao

(10) Patent No.: US 8,880,674 B2
(45) Date of Patent: *Nov. 4, 2014

(54) INFRASTRUCTURE MANAGEMENT OPERATIONAL WORKFLOWS

(75) Inventor: Sudhir Gurunandan Rao, Portand, OR (US)

(73) Assignee: International Business Machines Corporation, Armonk, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 13/557,358

(22) Filed: Jul. 25, 2012

(65) Prior Publication Data

US 2012/0331151 A1    Dec. 27, 2012

Related U.S. Application Data

(63) Continuation of application No. 13/168,998, filed on Jun. 26, 2011.

(51) Int. Cl.
G06F 15/173   (2006.01)
G06F 9/06    (2006.01)
G06F 9/46    (2006.01)
H04L 29/08   (2006.01)

(52) U.S. Cl.
CPC ....... *G06F 9/06* (2013.01); *G06F 9/465* (2013.01); *H04L 29/08135* (2013.01)
USPC ........... 709/223; 709/224; 709/225; 709/226; 709/201

(58) Field of Classification Search
USPC .............. 709/223, 229, 226, 224, 225, 201; 717/110, 101; 714/47
See application file for complete search history.

(56) References Cited

U.S. PATENT DOCUMENTS

| | | | |
|---|---|---|---|
| 7,213,037 B2 | 5/2007 | Rangadass | |
| 7,568,019 B1* | 7/2009 | Bhargava et al. | 709/223 |
| 2005/0071209 A1 | 3/2005 | Tatavu et al. | |
| 2005/0071420 A1 | 3/2005 | Trossman et al. | |
| 2005/0198618 A1* | 9/2005 | Lalonde et al. | 717/110 |
| 2006/0106945 A1 | 5/2006 | Westervelt et al. | |
| 2006/0161879 A1* | 7/2006 | Lubrecht et al. | 717/101 |
| 2007/0094367 A1* | 4/2007 | Esfahany et al. | 709/223 |

(Continued)

FOREIGN PATENT DOCUMENTS

WO    WO2009021208 A1    2/2009

OTHER PUBLICATIONS

Blake-et al.; "Agent-Based Communication for Distributed Workflow Management Using Jini Technologies"; Google; vol. 12, No. 1, pp. 81-99; 2003.

(Continued)

*Primary Examiner* — Le H Luu
(74) *Attorney, Agent, or Firm* — John D. Flynn; Gregory K. Goshorn; Greg Goshorn, P.C.

(57) ABSTRACT

Provided are techniques for the orchestration of workflows such as, but not limited to, computer system server, storage, virtualization and cloud infrastructure management operations and tasks. The disclosed orchestration techniques support non-scripted native representations of the workflows and the addition of new object types or operation sets or services. The disclosed orchestration techniques support atomicity and transactional semantics of workflows and include the ability to configure parameters for execution of workflow, which influences, for example, error, temporal and automation semantics.

18 Claims, 14 Drawing Sheets

(56) References Cited

U.S. PATENT DOCUMENTS

| | | | |
|---|---|---|---|
| 2009/0287837 A1* | 11/2009 | Felsher | 709/229 |
| 2010/0083054 A1* | 4/2010 | Marvasti | 714/47 |
| 2010/0114642 A1 | 5/2010 | Dufosse et al. | |
| 2012/0331148 A1* | 12/2012 | Rao | 709/226 |
| 2012/0331149 A1* | 12/2012 | Rao | 709/226 |
| 2012/0331150 A1* | 12/2012 | Rao | 709/226 |

OTHER PUBLICATIONS

Visible Systems Corp.; "Holistic View of the Enterprise"; Google; 2004.

Cardoso-et al.; "Quality of Service for Workflows and Web Service Processes"; Google/Journal of Web Semantics; 2004.

Volter-et al.; "Patterns for Model-Driven Software-Development"; Google; pp. 1-50; May 2004.

Niwot Ridge Consulting; "Risk Assessment Template for Software Development or Acquisition Projects"; Google; 2001.

Stolze-et al.; "Agile Development of Workflow Applications with Interpreted Task Models"; ACM Digital Library; pp. 2-14; 2007.

Sousa, K.; "Model-Driven Approach for User Interface—Business Alignment"; ACM Digital Library; pp. 325-336; Jul. 2009.

* cited by examiner

INFRASTRUCTURE MANAGEMENT OPERATIONAL WORKFLOWS

CROSS-REFERENCES TO RELATED APPLICATIONS

The present application is a continuation and claims the benefit of the filing date of an application entitled, "Infrastructure Management Operational Workflows," Ser. No. 13/168,998, filed Jun. 26, 2011, assigned to the assignee of the present application, and herein incorporated by reference.

FIELD OF DISCLOSURE

The claimed subject matter relates generally to Information Technology (IT) infrastructure management and, more specifically, to orchestration of workflows such as computer system server, storage, network, virtualization and cloud infrastructure resource management operations and tasks.

SUMMARY

Provided are techniques for the orchestration of workflows such as, but not limited to, computer system server, storage, network, virtualization and cloud infrastructure management operations and tasks. Today, many system and enterprise management software applications support some form of "orchestration," which, simply stated, involves an execution of a sequence of simple or complex, but typically arbitrary, management operations, which is termed as "workflow." However, most forms of orchestration do not support either non-scripted native representations of the workflows or the addition of new object types or operation sets or services. Workflows in existing orchestration software are also typically hard-coded and support invocation of arbitrary scripts or JAVA® operations that are typically opaque to an orchestration engine. As a result, existing orchestration cannot support either atomicity or transactional semantics of workflows. In addition, existing orchestration software lacks the ability to configure parameters for execution of workflow, which influences, for example, error, temporal and automation semantics.

Relational database servers have implemented "workflows" using relational operations that are orchestrated and automated at runtime. Arbitrary declarative workflow specifications are supported by most relational database servers via structured query language (SQL). For example, new relational tables may be added at any time without requiring the fundamental model to be re-coded. The procedural/operational model for SQL is called Relational Algebra, which is a set of well-defined set of relational database operations that support composition of such operations.

Provided are techniques for, but not limited to, normalizing a set of infrastructure resource states to create a plurality of normalized infrastructure resource states; normalizing a set of infrastructure resources to create a plurality of normalized infrastructure resources, each normalized infrastructure resource corresponding to one of the normalized infrastructure resource states of the plurality of normalized infrastructure resource states; normalizing a set of operations for acting on the normalized set of infrastructure resources to create a plurality of normalized operations, wherein an input and an output corresponding to each normalized operation of the plurality of normalized operations has a defined type of a plurality of types; composing the normalized operations into an operational sequence such that the output of each normalized operation becomes the input of another normalized operation, wherein a defined type corresponding to each particular input matches a defined type corresponding to the corresponding output; generating a workflow plan as a named composition of normalized operations with well-defined operational semantics corresponding to the normalized infrastructure resource states, normalized infrastructure resources and normalized operations; and executing the workflow plan by evaluating and applying the well-defined semantics to the operational sequence.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
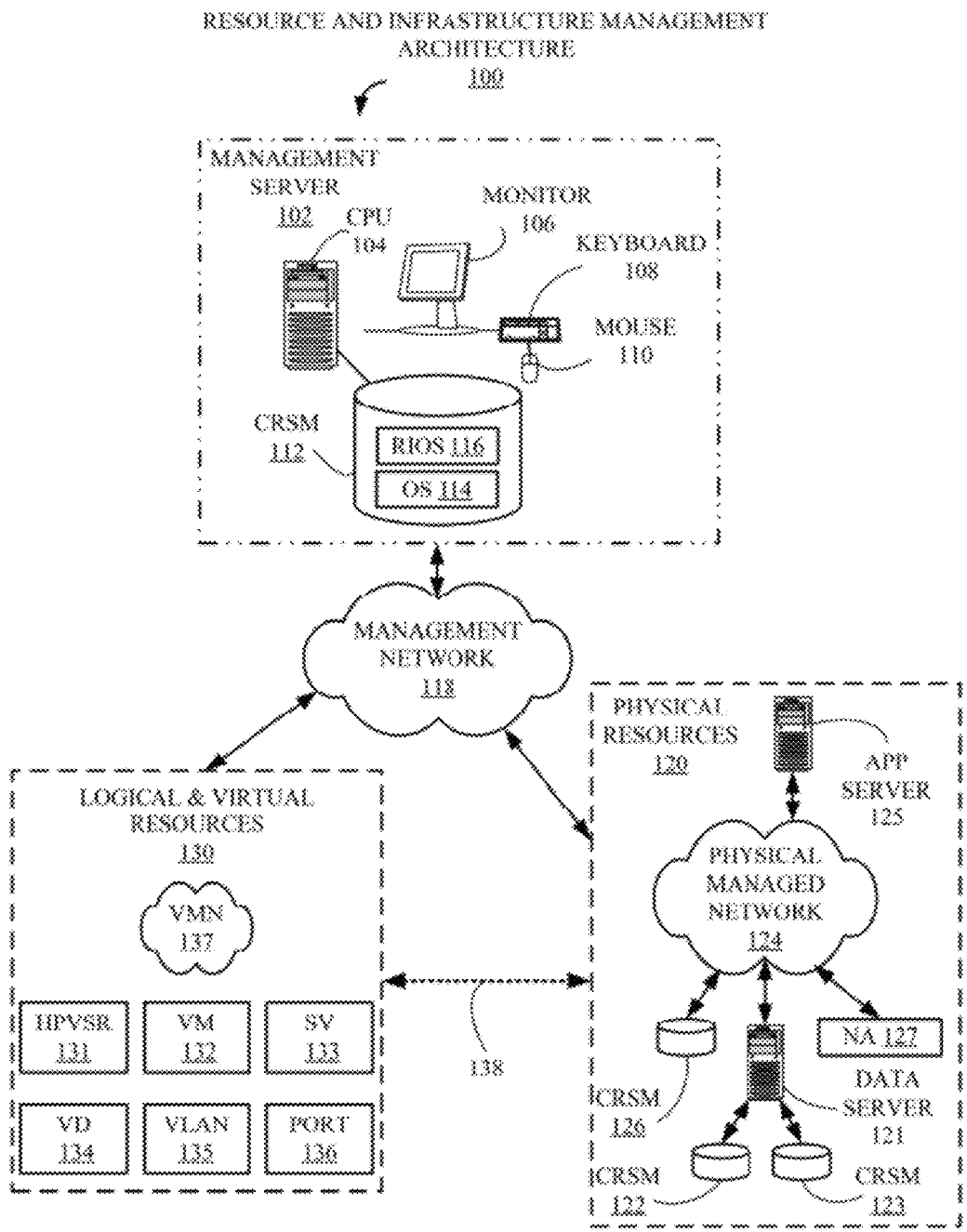
FIG. 1 is a block diagram of a resource and Infrastructure Management architecture that may support the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the figures, FIG. 1 is a block diagram of an example of a resource and infrastructure management architecture 100 that may implement the claimed subject matter. A management server 102 includes a central processing unit (CPU), or "processor," 104, coupled to a monitor 106, a keyboard 108 and a pointing device, or "mouse," 110, which together facilitate human interaction with computing system 100 and management server 102. Also included in management server 102 and attached to management server 102 is a computer-readable storage medium (CRSM) 112, which may either be incorporated into computing system 102 i.e. an internal device, or attached externally to management server 102 by means of various, commonly available connection devices such as but not limited to, a universal serial bus (USB) port (not shown). CRSM 112 is illustrated storing an operating system 114 and a Resource and Infrastructure Orchestration system (RIOS) 116 that may implement the claimed subject matter.

It should be noted that a management server 102 would typically include more elements than the illustrated components but for the sake of simplicity only the illustrated components are shown. RIOS 116 is described in more detail below in conjunction with FIGS. 2-14.

Management server 102 is connected to a management network 118, which may be, among other options, a local area network (LAN) or the Internet. A data server 121, coupled to a CRSM 122 and a CRSM 123, is also communicatively coupled to a physical managed network 124. Management network 118 provides connectivity between management server 102 and logical and virtual resource 130 and physical resources 120. Examples of devices that may be included in logical and virtual resources 130 include, but are not limited to a hypervisor (HYVSR) 131, a virtual memory (VM) 132, a storage volume (SV) 133, a virtual disk (VD) 134, a virtual LAN (VLAN) 135, a virtual communication Ethernet or FC port, or port, 136, a virtual managed network 137, a virtual switch (not shown) or a virtual Ethernet bridge (not shown). Examples of devices that may be included in physical resources 120 include, but are not limited to, an application server 125, managed network 124, data server 121 with attached CRSMs 122 and 123, a CRSM 126 and a network adaptor (NA) 127. Physical systems and resources may be connected to each other via physical managed network such as, but not limited to, a LAN, SAN or converged FCoE LAN.

Although in this example, management server 102, logical and virtual resources 130 and physical resources 120 are communicatively coupled via management network 118, they could also be coupled through any number of communication mediums such as, but not limited to, a wide area network (WAN) (not shown) and direct wire (not shown). Further, it should be noted there are many possible resource and infrastructure management system configurations, of which resource and infrastructure management architecture 100 is only one simple example.

Resources 120 and 130 represent a pool of virtual or logical resource elements of physical devices, or simply a "pool." In the following examples, the devices of pool are used as examples of computing resources, or objects, that may be orchestrated by means of the claimed technology. Collections of similar objects, such as CRSM 122 and 123 are referred to as groups. Relationships among different objects, including groups, such as the relationships among server 121 and CRSM 122 and 123 are referred to as infrastructures or fabrics. A dotted line 138 indicates that logical and virtual resources 130 represent various configurations of physical resources 120.

In addition, in the following example, the disclosed techniques are implemented by RIOS 116 executing on management server 102. It should be understood that many types of resources, both hardware and software, and systems may benefit form the claimed subject matter but for the sake simplicity the examples are limited to the types and numbers of components described above.

As the Inventors herein have realized, a Resource and Infrastructure Management operational workflow can be written as a composition resource management operations with well-defined operational semantics and flexible enough to support any hardware and/or software infrastructure resource, including, for example, servers, storage, networks, virtualization elements and combinations thereof, including cloud elements.

Throughout the Specification, a "resource" may be an individual atomic or composite objects, physical, logical or virtual computing objects, networking, storage or virtualization objects. Typically, a resource may exist independently and/or may be provisioned independently. Examples of physical resources include server systems, storage systems, network switches, disk drives, adapters and so on. Examples of logical and virtual resources include virtual machines, storage volumes, files, virtual disks and so on. An atomic resource is one that cannot be divided. In a hierarchical definition, a resource may be a composite unit comprising other sub-resources. One examples of a composite resource type is a BladeCenter chassis. A group may be any collection of homogeneous or heterogeneous resources. Examples of groups include server pool, multi-pathing group, HA-redundant pair of network adapters, virtual machine collection and so on. A fabric is defined herein as an aggregate of typically logical connections between resources or groups of resources. Examples of fabrics include VLANs, FC SAN zones and so on.

In order to compose resource management operations the resource and infrastructure operational model supports the following:

1) Normalized set of infrastructure resource states (see FIG. 3): Normalizing the states of infrastructure resources (whether basic resource objects or groupings or composite objects involving higher-level objects) helps to reduce the total set of states "adjectives" (e.g., Undeployed, Deployed, etc) and also to classify the resource management operation space. This applies to all infrastructure resource elements such as, but not limited to, servers, networks and virtualization resources.

2) Normalized set of Infrastructure Resources: Normalizing the infrastructure resource space into a few basic types (e.g., resource, group, fabric etc) helps reduce the total number of "nouns" involved which in effect helps normalize the infrastructure management operations. In addition, resource objects may be defined as atomic objects, i.e. indivisible (e.g. disk drive, storage volume, virtual machine, adaptor), or object-composition, i.e. a composite object (e.g. BladeCenter chassis comprising multiple modules, chassis, blades, PSU, etc.). Throughout the remainder of the Specification, an object-composition is termed as a composite object to avoid confusion with an operational composition.

3) Normalized with Strong Typing of the Set of infrastructure operations: All infrastructure management operations need to be strongly typed—that is, their operation schema needs to be very well-defined (e.g., inputs, outputs, error semantics). The operations need to be normalized via reduction of the total number of "verbs" in the vocabulary as well as normalizing the signature of the operation itself. Each operation is typically either a unary (single input) or binary operation (dual input), although occasionally more inputs may be employed. Typically, the same rules that apply to binary inputs apply to operations with three or more inputs. For the sake of simplicity, throughout the remainder of the Specification, examples and descriptions involve unary and binary operations.

4) Composition of normalized operations: "Composable" operations are now well-defined normalized operations that fit one common operational schema. A composition of these operations can then be applied in sequence such that the unary (or binary) input(s) to the $N^{th}$ operation is (are) the output of the $N-1^{st}$ operation (and the output of the $N-2^{th}$ operation) and the output of the $N^{th}$ operation in turn becomes an input of the $N+1^{st}$ operation. The only constraint is that the input and output types must match, i.e. a "strong typing" requirement. The workflow operations defined earlier are all by definition composable operations. A sequence of such operations with input and output relationships between operations as described above is defined as an ordered composition of operations. The ordering is derived from the particular sequence in which the operations are applied (example: $N+1^{st}$ operation, Nth operation, $N-1^{st}$ operation). An ordered composition of operations may be a partial order if binary operations are involved or a fully ordered composition if only unary operations are involved. For example, in the case of binary operations, there may not be an order specified between evaluation of left and right inputs. The term "partial" order is used to represent the more general binary input case.

5) Calculus of normalized operations: Together, the set of all normalized operations and the rules for composition of such operations are referred to as the calculus of resource and infrastructure operations.

6) Workflow as a composition of operations: A resource and infrastructure operational workflow, or a plan, is a named partial order composition of it set, or library, of named operations drawn from a larger set of pre-defined resource or infrastructure management operations.

7) Well-defined runtime semantics for the workflow: The workflow runtime semantics is defined via a workflow plan "semantics" object that is passed as an additional argument to the workflow plan. In general, the workflow plan semantics are defined to support typical desired semantics such as, but not limited to, below:

Atomicity semantics: This is supported only if for every control operation there is a matching rollback operation that is defined.

Error handling semantics: This is useful to suggest whether to return on first critical error or continue even if an error is encountered.

Ordering semantics: In a partial order workflow plan, an ordering may be specified for the sub-compositions of the plan that may be otherwise run asynchronously.

Priority semantics: In a work-flow plan, a priority may be attached for the particular sub-composition of the workflow plan. For instance, a particular sub-composition may be attached high priority in which case all resources may be provided to the high priority sub-composition.

Temporal/Automation semantics: This is used to suggest perhaps how much time to wait before the plan starts to be executed or how much time to wait between any two partial orders before declaring a problem and so on.

Figure 2:
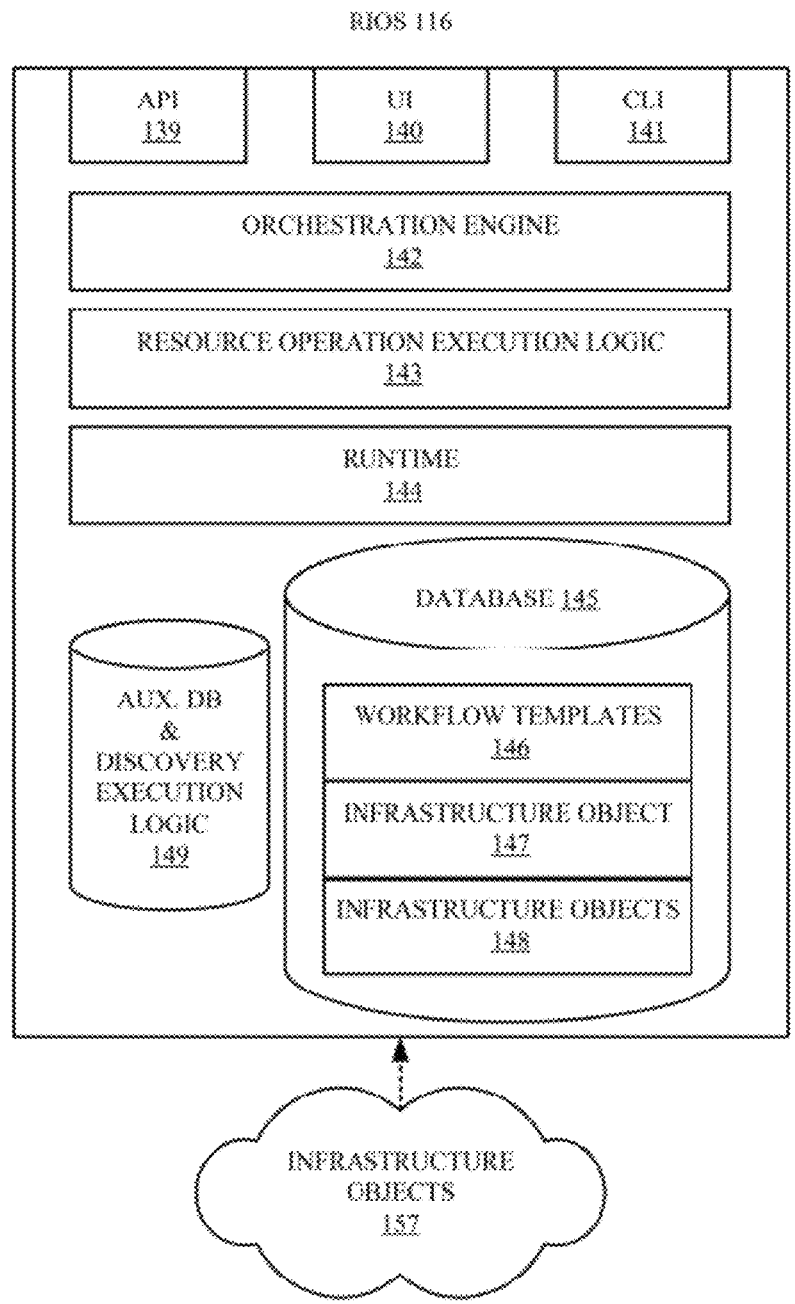
FIG. 2 is a block diagram of a Resource and Infrastructure Orchestration System (RIOS), first introduced in FIG. 1, in more detail.

FIG. 2 is a block diagram of RIOS 116, first introduced in FIG. 1, in more detail. RIOS 116 includes three (3) types of input/output (I/O) ports, i.e. an application programming interface (API) 139, a user interface (UI) 140 and a command line interface (CLI) 141. Those with skill in the relevant arts will recognize the different interfaces 139-141 as well other suitable types of interfaces. I/O ports 139-141 handle communication ROS 116 has with other components of management server 102 (FIG. 1) and system 100 (FIG. 1).

RIOS 116 also includes an orchestration engine 142 that stores executable logic for the implementation of aspects of the claimed subject matter including the definition of workflows. A Resource Operation Execution Logic (ROEL) 143 stores executable logic that implements a defined workflow. A runtime 144 stores executable logic for the implementation of aspects of RIOS 116 not handled by orchestration engine 142 and ROEL 143.

A management database 145 is a computer-readable storage medium that stores workflow templates 146, infrastructure objects 147 and modeled infrastructure objects 148. Workflow templates 146, Infrastructure object 147 and infrastructure objects 148 may store parameters such as, but not limited to, definitions of runtime semantics and definitions of normalized resources, resource states and operations. Such definitions may be composed into libraries that are extendable by the addition of additional definitions of runtime semantics and definitions of normalized resources, resource states and operations. Infrastructure objects 157 represents potential resources that may be discovered by discovery execution logic 149 at remote locations such as over the Internet. Functionality associated with components 139-149 and 157 are explained in more detail below in conjunction with FIGS. 3-14.

Figure 3:
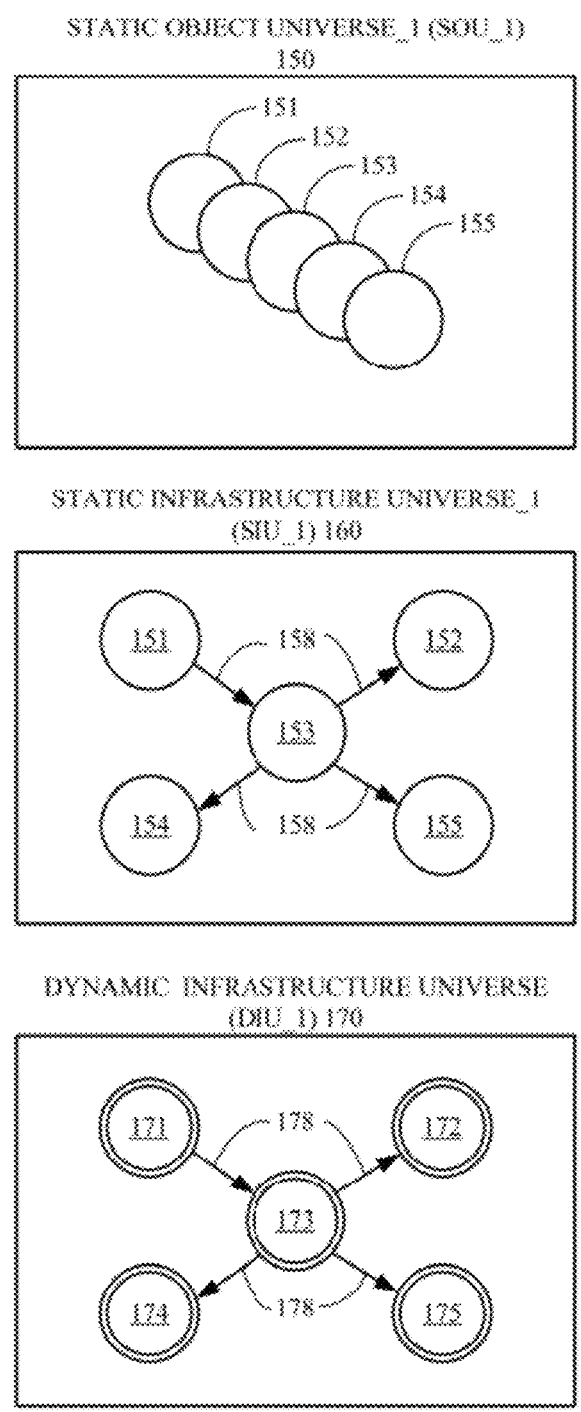
FIG. 3 is a block diagram of normalized infrastructure resource states employed by the claimed subject matter.

FIG. 3 is a block diagram of three (3) normalized infrastructure resource states employed by the claimed subject matter. Normalizing states of infrastructure resources (whether basic resource objects or groupings or composite objects involving higher-level objects) reduces the total set of states "adjectives" (e.g., Undeployed, Deployed, Activated, etc) and also facilitates classification of an infrastructure management operation space.

The three states include a Static Object Universe 1 (SOU_1) 150, a Static Infrastructure Universe 1 (SIU_1) 160, and a Dynamic Infrastructure Universe 1 (DIU_1) 170. Static Object Universe (SOU_1) 150 is the universe of undeployed manageable resource and system objects known to a particular embodiment of the claimed subject matter. SOU_1 150 illustrates objects 151-155 in an "undeployed" state, i.e. with no defined relationships. Objects in this universe are static and in a restful state. Static Infrastructure Universe ($SIU_{13}$ 1) 160 is the universe of all Deployed (connected) resources and composite resources known to a particular embodiment of the claimed subject matter. In this universe, the relationships and connections between resources are explicit. In this example, SIU_1 160 illustrates objects 151-155 in a "deployed" state and some relationships 158 among objects 151-155. In general, objects and the corresponding relationships define an "infrastructure" such as SIU_1 160. However, infrastructure resources in this universe are still static and not performing any useful function, Dynamic Infrastructure Universe (DIU_1) 170 is the universe of Activated infrastructure resources that are deployed to perform some useful function in an interconnected way and known to a running computer program embodiment of this invention. DIU_1 170 illustrates objects 171-175 in an "activated" state with some relationships 178. Because DIU_1 170 defines both objects and relationships. DIU_1 170 represents a dynamic infrastructure.

A core set of infrastructure resources may be broadly classified into physical resources (see 120, FIG. 1) (e.g. systems or platforms disk drives, etc.), logical resources (see 130, FIG. 1) (e.g. virtual machines, storage volumes, virtual disks, ports, etc.), groups (e.g., disk drive arrays, server system pools, multi-pathing group, etc.), and fabrics (e.g., VLANs, FC SAN, etc). The rest of the types are composite objects on these basic resource types and in turn represent higher-order resources, groups and/or fabrics. In this example, infrastructure resource states are reduced to the 3 key states: Undeployed, Deployed, and Activated. Undeployed implies—not usable or exploitable. Deployed implies usable or exploitable. Activated implies being-used or exploited at any point in time. For example, a server in a reserve pool is undeployed, a storage volume attached to as server is deployed, and a virtual memory (VM) that has been started up is in activated state. In some cases, the move from deployed to activated may be a no-operation, or "nop," but this normalized view across all resources facilitates the definition of an operational workflow. In addition, resources may have other states and status in which an administrator is interested; they maybe handled as before and are not critical to the operational workflow model.

Infrastructure management operations are strongly typed in that they have well-defined Inputs, Outputs and Operation Semantics. Inputs are well-defined resource or group or fabric types. Some examples include, but are not limited to:

Unary Operations: These are workflow operations that take a single input (Target);

Binary Operations: These are workflow operations that take two inputs (Source & Target;

Inputs: These are well-defined resource, group or fabric type objects;

Output: Output is a well-defined resource, group or fabric type object;

Operation semantics: The operation has to have a semantics object that carries the initial profile or best practice pattern for the object and/or the semantics of the operation itself including any best practice pattern that may apply.

Operations are strongly typed as follows. One embodiment of the signatures for the operations in this calculus are described below using a procedural programming language flavor such as C, C++ or JAVA. Unary operations of the calculus have the following signature:

ReturnedObject OperationPerformedOnSource (SemanticsObject, TargetObject, RuntimeContextObject);

and all binary operations of the calculus have the following signature:

ReturnedObject OperationPerformedOnSource (SemanticsObject, SourceObject, TargetObject, RuntimeContextObject);

where SemanticsObject defines the profile, best practice, or policy applied on the object or the operation. Supporting operations are provided to generate this object from object profiles, policies, and best practices.

SourceObject is the Object which is the target for source for binary operations.

TargetObject is the target object for both unary and binary operations.

RunTimeContextObject is the object that carries the RuntimeContext for the operation and it carries error, async/sync semantics, locking/unlocking semantics, transaction IDs if any and is passed from operation to operation and ReturnedObject is the output that is the end result of the operation. For example, with respect to a Create operation, the created object is the ReturnedObject; with respect to as Move operation, the moved object in its moved state or location is the ReturnedObject.

Ternary operations, if applicable in the calculus, has as Source, Target and an Intermediate or Staging object as inputs.

The exact implementation of the application programming interface above depends on the implementation. In general, regardless of whether an object is carried around as a reference type and returned as a reference type is up to the implementation. Implementations may vary depending on the language used for implementation. Other embodiments are possible within procedural languages, functional languages (such as Scheme), or logical calculus languages (which are beyond the scope of this invention). With the resource state, typing, and infrastructure management operations being normalized, the calculus comprises an enumerated normalized set of operations (otherwise termed as a library of operations). In general, a core subset of the enumerated set is expected to apply to all resources, groups, and fabrics. For example, Create, Delete, Deploy, Undeploy, Activate, and De-activate are expected to be applicable to all logical resources regardless of whether they are server, storage, or network resources. It is possible for as subset of the calculus to be applicable to only a subset of the resources. For example, Backup and Archive may apply only to storage resource objects. The calculus of operations is not a static and fixed set—additional operations discovered subsequently can be added to the set as long as it follows the constraints posed by this model.

Figure 4:
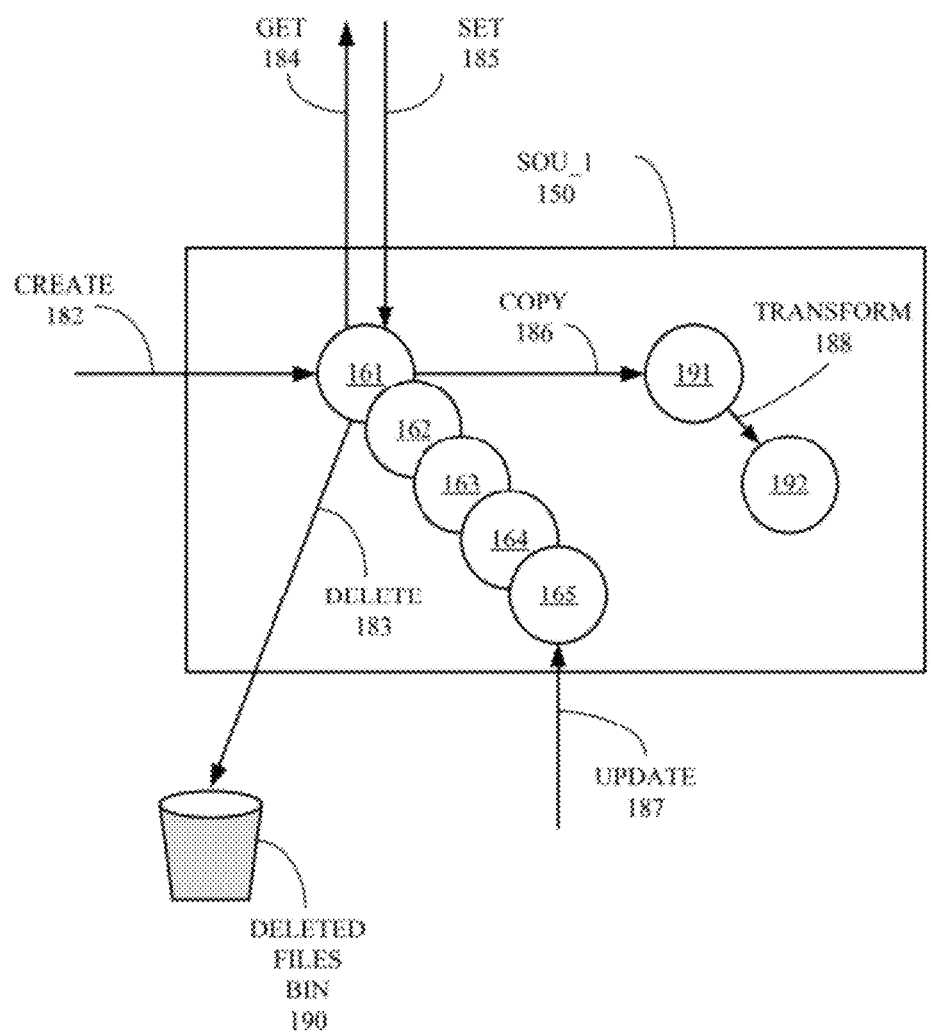
FIG. 4 is a block diagram illustrating basic resource control that may be employed with respect to the disclosed technology.

FIG. 4 is a block diagram illustrating Basic Control with respect to SOU_1 150 (FIG. 3). Like FIG. 3, FIG. 4 includes objects 161-165. In addition, FIG. 4 illustrates several management operations that may be taken with respect to objects such as objects 161-165, including a Create 182, a Delete 183, a Get 184, a Set 185, a Copy, or "Clone," 186, an Update 187 and a Transform 188. Operations 182-188 are typically used for the life-cycle of static resource objects and most operations continue to keep the resource in static state, i.e. typically performed on Undeployed objects with the exception for the Deploy operation that takes a resource object from an Undeployed state to a Deployed state.

Create 182 creates a static database object and possibly a memory object that represents a manageable and provisionable resource using the attributes, defined ports/objects and constraints presented in a best practices template for the resource object. Create 182 is generally used for static creation of a logical resource object. For example, a cluster is a composite resource object that may be statically created. See "Reform" which is a dynamic re-formation of a cluster and applies only to clusters. There may be other "add," "create," "discover," "delete" or "remove" operations where end-point instances or group instances are added or created within the database or runtime. These operations do not have any defined input end-point or group. Any end-point/group specification is performed as part of the constraints for the operation (see below). The output of these operations is an end-point or a group.

Delete 183 deletes an in-memory and/or database object. Delete 183 takes an end-point or group as input and return NULL as output. With respect to Get 184, filter criteria may be specified in a SemanticsObject and if the filter when applied turns out to be TRUE, then for resources, platforms, fabrics or groups the corresponding objects are returned. Set 185 performs configuration, state-changing, etc operations on the object. Copy 186 typically applies to logical resources and causes a clone with a new object ID to be created. In this example, object 161 has been copied to create a new object 191.

Update 187 is a typically a nop for all but for physical Platform objects (also typically termed as systems or devices). If an object represents an updatable software or hardware platform that requires a systems software or firmware update, then Update 187 is applicable. Transform 188 is typically used to transform the type of an object. In this example, object 191 has been transformed to a new object 192.

Figure 5:
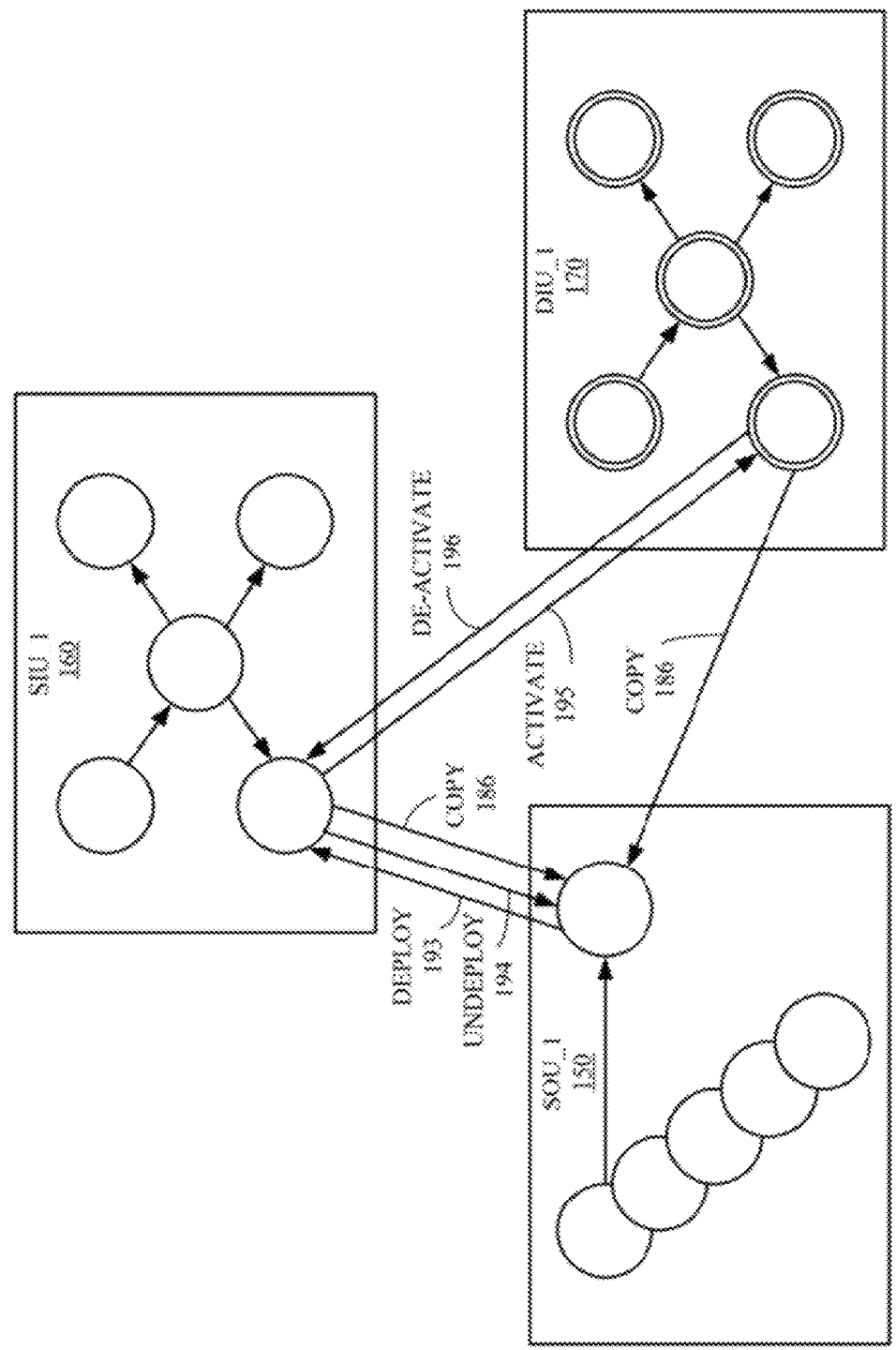
FIG. 5 is block diagram illustrating deployment control that may be employed with respect to the disclosed technology.

FIG. 5 is block diagram illustrating Deployment and Activation Control that may be employed with respect to SOU_1 150, SIO_1 160, and DIU_1 170 of FIG. 3. Deployment and activation control operations are typically used to put infrastructure resources to use for exploitation or to pull out of exploitation. FIG. 5 illustrates key operations that change the Deployed or Activated state of the resource. Note that Copy 186 (FIG. 4) is shown here only as an example for creating a static clone of a Deployed or Activated object.

A Deploy 193 typically refers to the deployment of an atomic or composite resource object. An Undeploy 194 typically refers to the removal of a resource object from the infrastructure. An Activate 195 typically refers to activating a resource object to become useful in the environment, if applicable, otherwise Activate 195 serves as a nop. A De-activate 196 refers to de-activating a resource object, if applicable, otherwise De-activate 196 serves as a nop.

Figure 6:
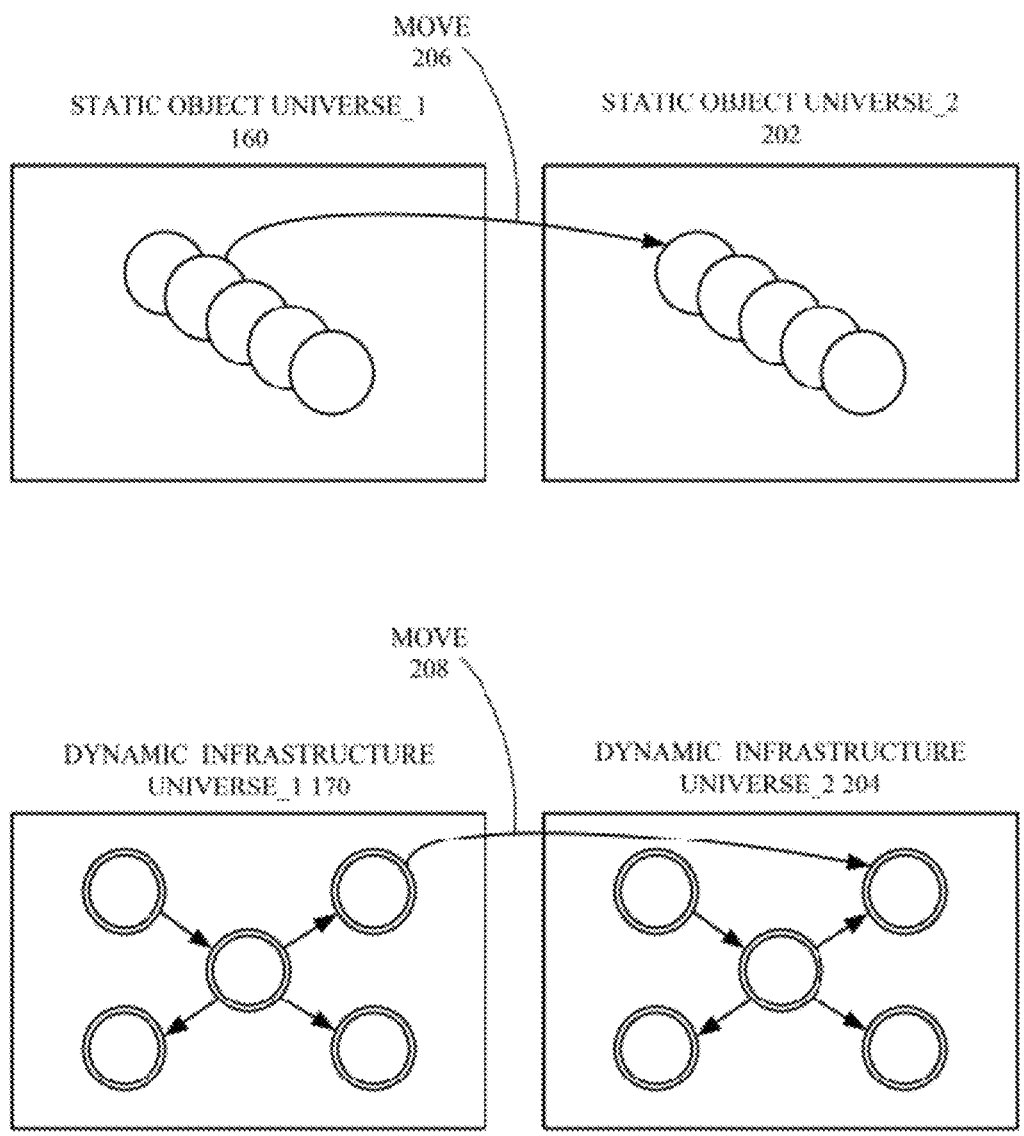
FIG. 6 is a block diagram illustrating mobility control that may be employed with respect to the disclosed technology.

FIG. 6 is a block diagram illustrating Mobility Control that may be employed with respect to different universes such as SOU_1 150, SIO_1 160 and DIU_1 170 of FIG. 3. These operations are used to move or migrate resources in the infrastructure (e.g., VM mobility, storage migration). The nature of the move may be local or remote depending on the kind of object and the kind of network fabric underneath. The diagram depicts a Move 206 in which an object in SOU_1 150 is moved to another static object universe 2 (SOU_2) 202. The diagram also depicts a Move 208 in which an object in DIU_1 160 is moved to another dynamic infrastructure universe 2 ($DIU_{13}$ 2) 204. VM mobility is a dynamic example whereas storage migration of a static storage volume object is a static example. It should be noted that Mobility Control does not typically apply to physical resources such as server systems, disk drives, etc.

Figure 7:
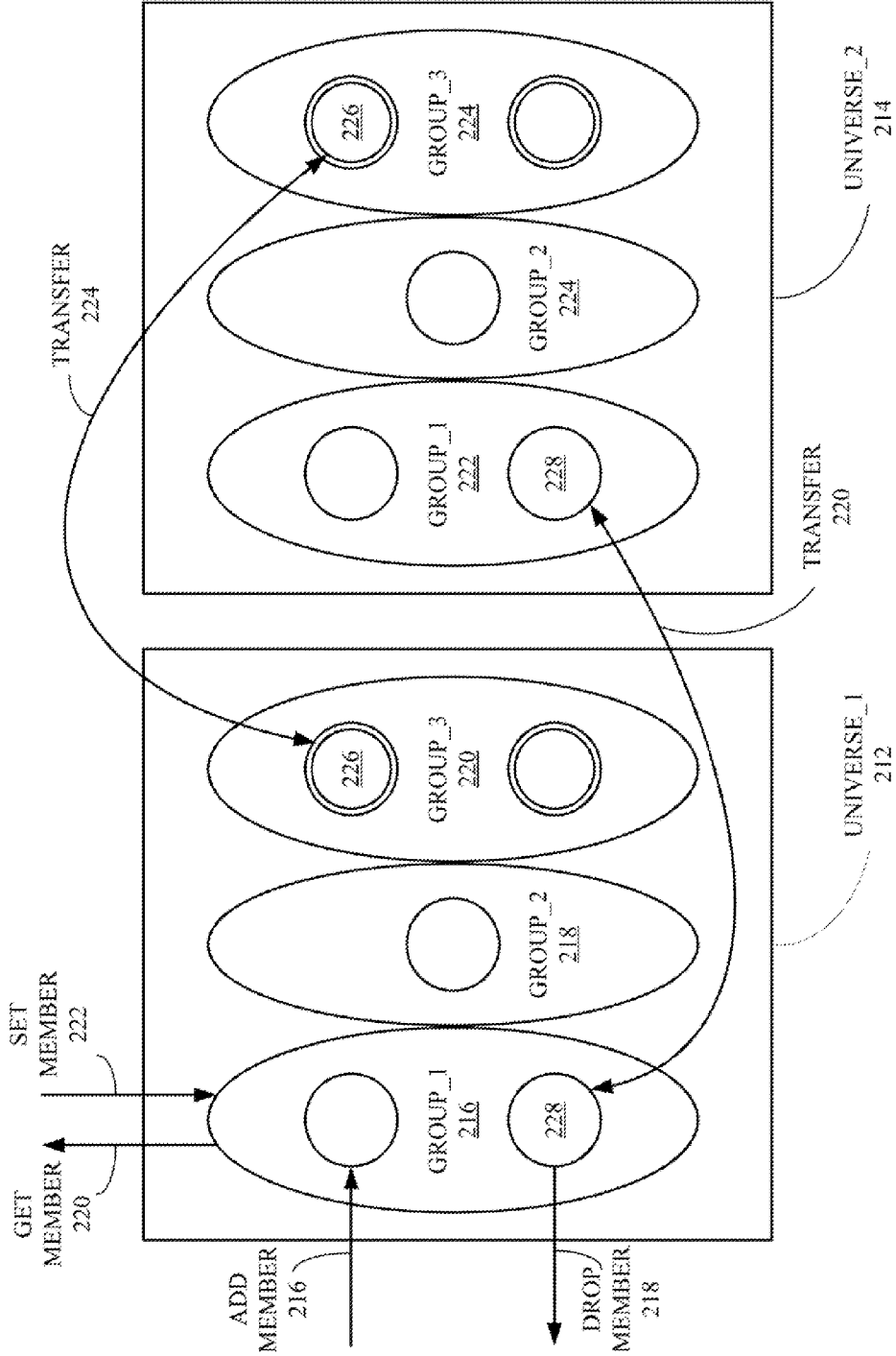
FIG. 7 is a block diagram illustrating group and composite control that may be employed with respect to the disclosed technology.

FIG. 7 is a block diagram of illustrating Group and Composite-Object Control that may be employed with respect to different universes such as a Universe_1 212 and a Universe_2 214. These operations apply to groups of resources or higher-order composite objects. When the object is a group, a "member" represents a member of the group. When the object is a "composite object" then that "member" represents a sub-component of the composite object (e.g., blade is a member of a chassis). Examples of operations include, but are not limited to an Add Member 216, a Drop Member 218, a Get Member 220, a Set Member 222 and a Transfer 224.

Add Member 216 adds an object or a sub-component to a group or composite object. For a composite object, the semantics may provide additional constraints on where to add the member. Drop Member 218, drops, or removes, a member from a group or composite object. Get Member 220 applies filter criteria in the SemanticsObject and if the filter when applied turns out to be TRUE, then if a singular object satisfies the filter the member object is returned else NULL or NULL-GROUP is returned. NULL-GROUP implies more than one object was returned. Set Member 222 involves, if applicable, modifying the state of a particular member that matches a filter (e.g., an identifier) in the group or composite object. A Transfer 224 moves an object from one universe to another. In this example, Transfer 224 is illustrated moving both a dynamic object 226 and a deployed object 228 between Universe_1 212 and Universe_2 214.

In addition there may be a GetSubGroup (not shown) that applies to sub-groupings or sub-composite objects within composite objects, respectively. Those member objects that result in a filter being TRUE are returned as a group of the same type as the original group (If the original object was a heterogeneous group and the filter retained only homogeneous objects, the returned group is still a heterogeneous group of the same type as the original group. There may also be a SetSubGroup (not shown) used to set the states of all members in the group that satisfy a filter criteria. A FormGroup (not shown) is used when a grouping or composite object supports a dynamic ability to "form" the group (example: clusters supports dynamic reformation of the group). A BreakGroup (not shown) is used to decompose the group object, e.g. to: break a cluster apart.

Figure 8:
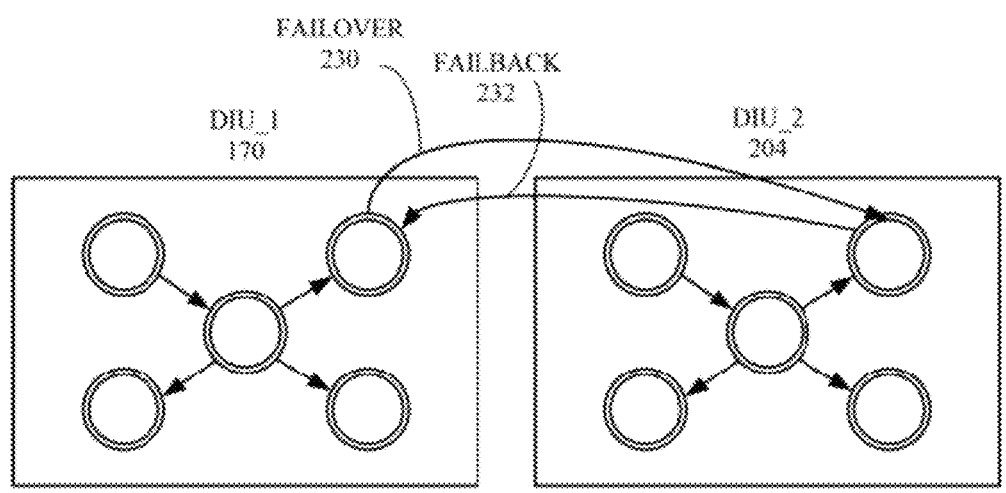
FIG. 8 is a block diagram illustrating availability control that may be employed with respect to the disclosed technology.

FIG. 8 is a block diagram illustrating Availability Control that may be employed with respect to different universes such as DIU_1 170 (FIGS. 3, 5 and 6) and DIU_2 204 (FIG. 6). Availability control is provided with two (2) value-added functions for which implementation is optional but at a minimum stubs are recommended. Provided is a Failover 230, which is employed to failover a basic resource object or a composite-object from one location (or universe) onto another location (or Universe), typically in a Disaster Recovery scenario (not shown) and/or a Failback 232.

Figure 9:
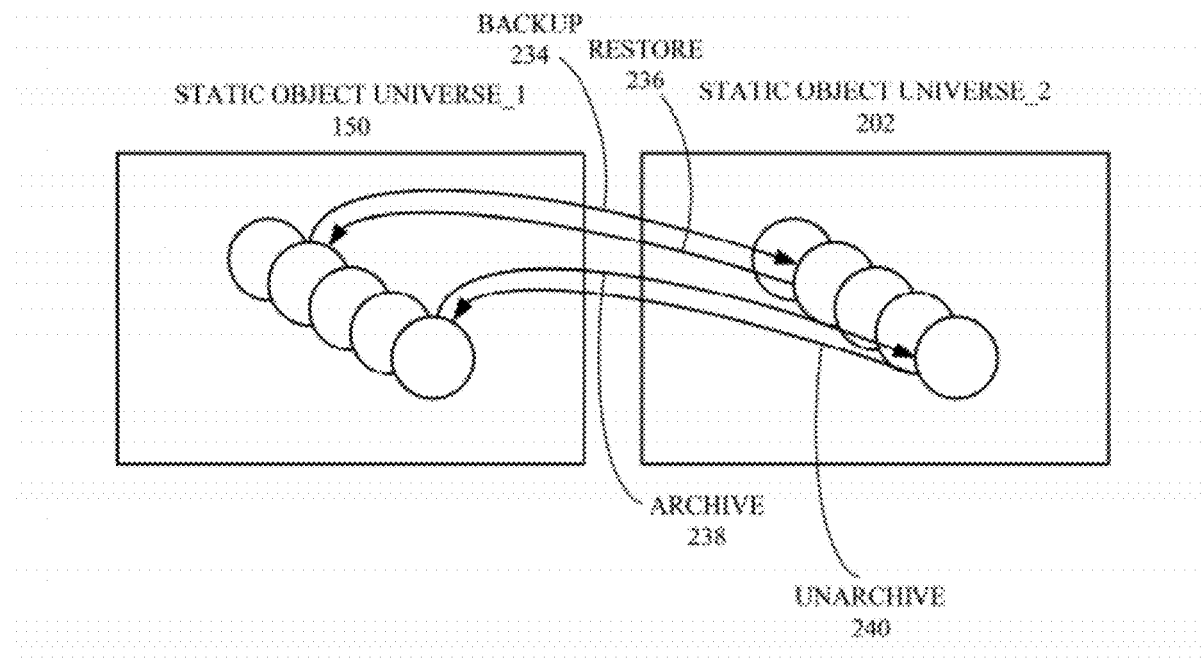
FIG. 9 is a block diagram illustrating durability control that may be employed with respect to the disclosed technology.

FIG. 9 is a block diagram illustrating Durability Control that may be employed with respect to different universes such as SOU_1 150 (FIGS. 3-6) and SOU_2 204 (FIG. 6). In this example, SOU_2 204 is the backup or archive storage location for resources. Functions that provide the disclosed actions include a Backup 234, which typically performs a backup of a storage resource in a specific location; a Restore 236, which typically performs a restore of a storage resource from its backup; an Archive 238, which typically performs an archive of a storage resource at a specified secondary storage location; and an Unarchive 240, which typically returns the object from its archived state back to primary storage. These operations are typically used to enhance the long-term durability of data or storage objects.

Figure 10:
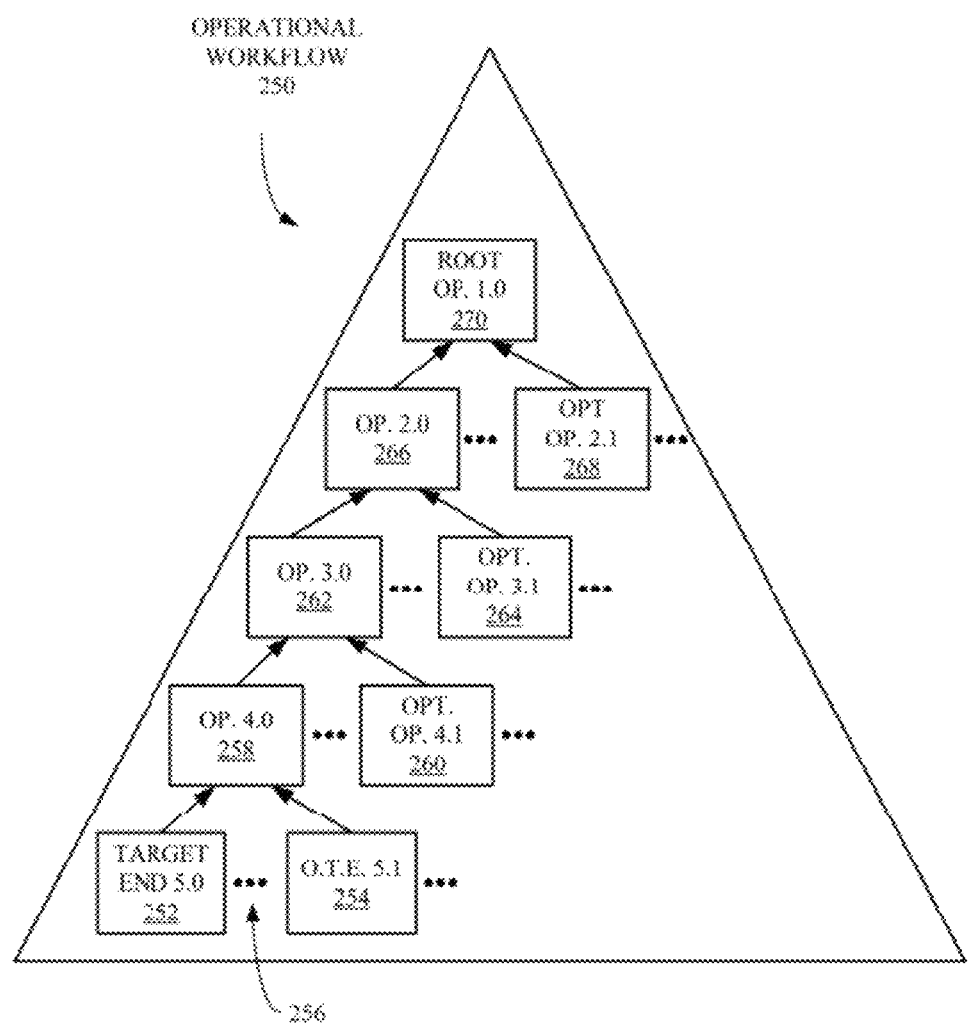
FIG. 10 is a block diagram illustrating a composition of normalized infrastructure operations that may be employed with respect to the disclosed technology.

FIG. 10 is a block diagram illustrating a composition of normalized infrastructure operations that may be employed with respect to the disclosed technology. Included is an operational workflow 250. A composition of normalized infrastructure operations such as operational workflow 250 may be applied in a sequence such that the input to the $N^{th}$ operation is the output of the $N-1^{th}$ operation and the output of the $N^{th}$ operation in turn becomes the input of the $N+1^{th}$ operation. One constraint is that input and output types match. Workflow operation 250 defined is by definition a composable operation. The ordering is derived from the particular sequence in which the operations are applied. For example, in FIG. 10, a Target End-Point (EP) 5.0 operation 252 and an Optional Target End-Point 5.1 (OTE) 254 are executed and the corresponding outputs become inputs to an Operation (Op.) 4.0 258. The notations such as notation ". . . " 256 following elements of operation workflow 250 indicate that there may be one (1) or more additional, similar elements corresponding to each element.

In a similar fashion, outputs corresponding to Operation 4.0 258 and an Optional Operation 4.1 260 provide inputs to an Operation 3.0 262; outputs corresponding to Operation 3.0 262 and an Optional Operation 3.1 264 provide inputs to an Operation 2.0 266; and outputs corresponding to Operation 3.0 2628 and an Optional Operation 3.1 264 provide inputs to an Operation 2.0 266. Finally, outputs corresponding to Operation 2.0 266 and an Optional Operation 2.1 268 provide inputs to a Root Operation 1.0 270. A sequence of named workflow operations such as workflow 250 and additional operational workflows (not shown) may be applied with the inputs and outputs of the operations as defined above in what is referred to an ordered composition.

Figure 11:
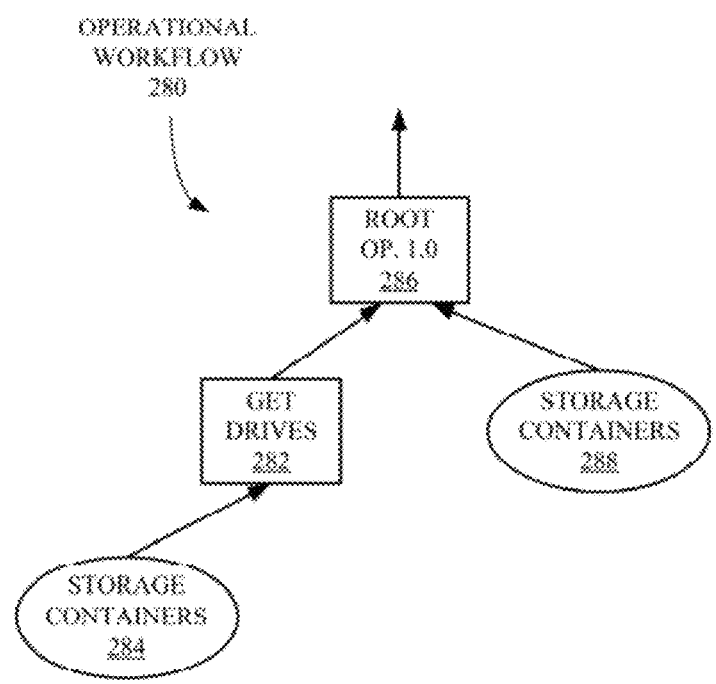
FIG. 11 is a block diagram illustrating one example of a workflow employed according to the disclosed technology to create a redundant array of independent disks (RAID) resource object.

FIG. 11 is a block diagram illustrating one example of a workflow, i.e. an operational workflow 280, employed according to the disclosed technology to create a redundant array of independent disks (RAID) resource object. In this example, a Get Drives operation 282 picks available storage drives from a storage container 284. A Root operation 1.0 286 then combines the picked storage drives into a configuration selected from possible configurations detailed in a storage containers 288. For example, a number of disk drives may be combined to create a RAID 1 or a RAID 5 array. The semantics object may be different for each object type, i.e. RAID 1 and RAID 5, and so for each operation such as root operation 1.0 286 in a workflow such as workflow 289 an appropriate semantics object is created. However, runtime semantics for a workflow is captured in specific runtime semantics objects.

Examples of operations for best practice and operational semantics include:
  CreateSemanticsObj ( )—This creates a semantics object based on the profiles or best practices or policies for an object or the operation in question.
  DeleteSemanticsObj ( )—This deletes a semantics object (if persistent).
  GetSemanticsObj ( )—This can retrieve semantics objects for an object type or operation.
  SetSemanticsObj ( )—This can modify a semantics object.

Figure 12:
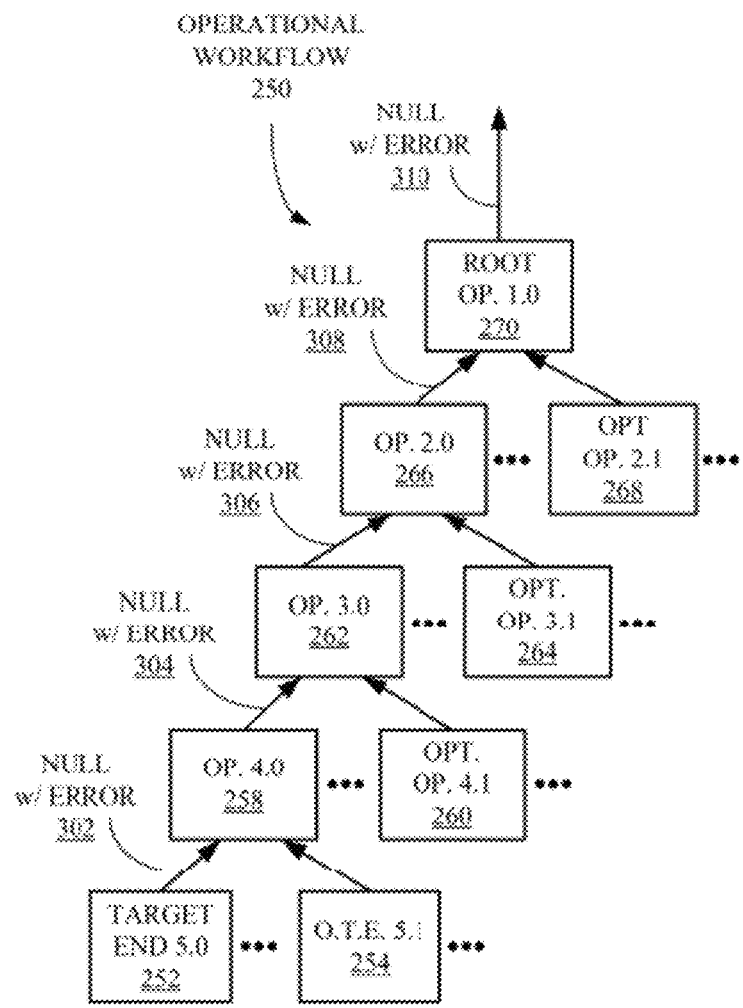
FIG. 12 is a block diagram of an Error Semantics that may be employed with respect to the disclosed technology.

FIG. 12 is a block diagram of Error Semantics in conjunction with operation workflow 259 (FIG. 10). Like FIG. 10, FIG. 12 includes target end 252, OTE 254, operations 258, 260, 262, 264, 266, 268 and 270. Also illustrated are Null with Error 302, which is transmitted from target End 5.0 252 to op. 4.0 258 upon detection of an exception during processing. In a similar fashion under similar circumstances, a Null with Error 304 is transmitted from Op. 4.0 258 to OP. 3.0 262, a Null with Error 306 is transmitted from Op. 3.0 262 to OP. 2.0 266, a Null with Error 308 is transmitted from Op. 2.0 266 to Root OP. 1.0 270. In addition, a Null with Error 310 is transmitted form Root Op. 270 is a process that initiated operation workflow 250. In this manner, an exception generated anywhere in the tree represented by operation workflow 250 is ultimately transmitted to the initiating process.

Examples of operations that may support validation with respect to error semantics include ValidateSemantics ( ) and ValidateWorkflow ( ). Operations that support blocking semantics include:

Lock ( )—This enables locking of an object (either in the database or in a lock implemented in an appropriate resource domain). READER, WRITER locks are implemented.

Unlock ( )—This unlocks an object.

UpgradeLock—This upgrades a lock (e.g., READER to WRITER).

DowngradeLock( )—This downgrades a lock.

Figure 13:
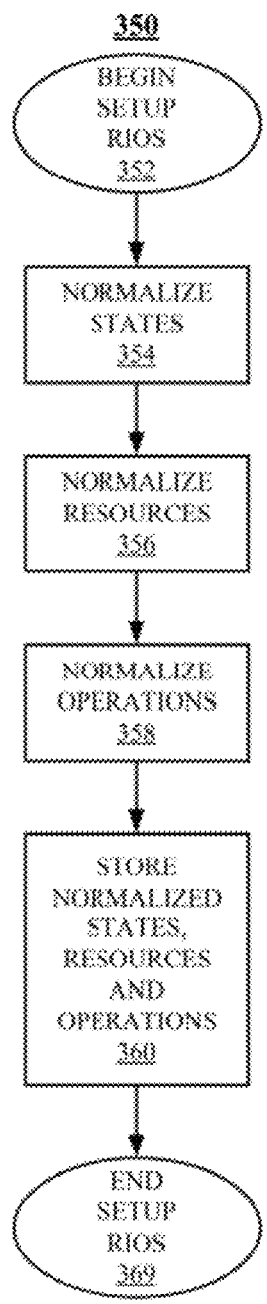
FIG. 13 is a flow chart of a Setup Operation Workflow process that may implement aspects the claimed subject matter.

FIG. 13 is a flow chart of a Setup Operation Workflow process 350 that may implement aspects the claimed subject matter. In this example, logic associated with process 350 may be stored in executable logic (see 142-149, FIG. 2) as part of RIOS 116 (FIGS. 1 and 2) and executed on CPU, or processor, 104 (FIG. 1) of management server 102 (FIG. 1).

Process 350 starts in a "Begin Setup RIOS" block 352 and proceeds immediately to a "Normalize States" block 354. During processing associated with block 354, a user or administrator defines a set of normalized infrastructure resource states (see FIG. 3). As explained above in conjunction with FIG. 1, normalizing the states of infrastructure resources (whether basic resource objects or groupings or composite objects involving higher-level objects) helps to reduce the total set of states "adjectives" (e.g., Undeployed, Deployed, etc) and also to classify the resource management operation space. This applies to all infrastructure resource elements such as, but not limited to, servers, networks and virtualization resources.

During a "Normalize Resources" block 356, a user or administrator of RIOS 116 classifies the resources in resource and infrastructure management architecture 100 (FIG. 1) according to the normalized infrastructure resource states defined during processing associated with block 354. As explained above, normalizing the infrastructure resource space into a few basic types (e.g., resource, group, fabric etc) helps reduce the total number of "nouns" involved which in effect helps normalize the infrastructure management operations. In addition, resource objects may be defined as atomic objects, i.e. indivisible (e.g. disk drive, storage volume, virtual machine, adaptor), or composite objects (e.g. BladeCenter chassis comprising multiple modules, chassis, blades, PSU, etc.).

During processing associated with a "Normalize operations" block 358 a user or administrator defines operations that may be executed with respect to the normalized set of resources generated during processing associated with block 356. As explained above, infrastructure management operations need to be strongly typed—that is, their operation schema needs to be very well-defined (e.g., inputs, outputs, error semantics). The operations need to be normalized via reduction of the total number of "verbs" in the vocabulary as well as normalizing the signature of the operation itself. Each operation is typically either a unary (single input) or binary operation (dual input), although occasionally more inputs may be employed. Typically, the same rules that apply to binary inputs apply to operations with three or more inputs.

Figure 14:
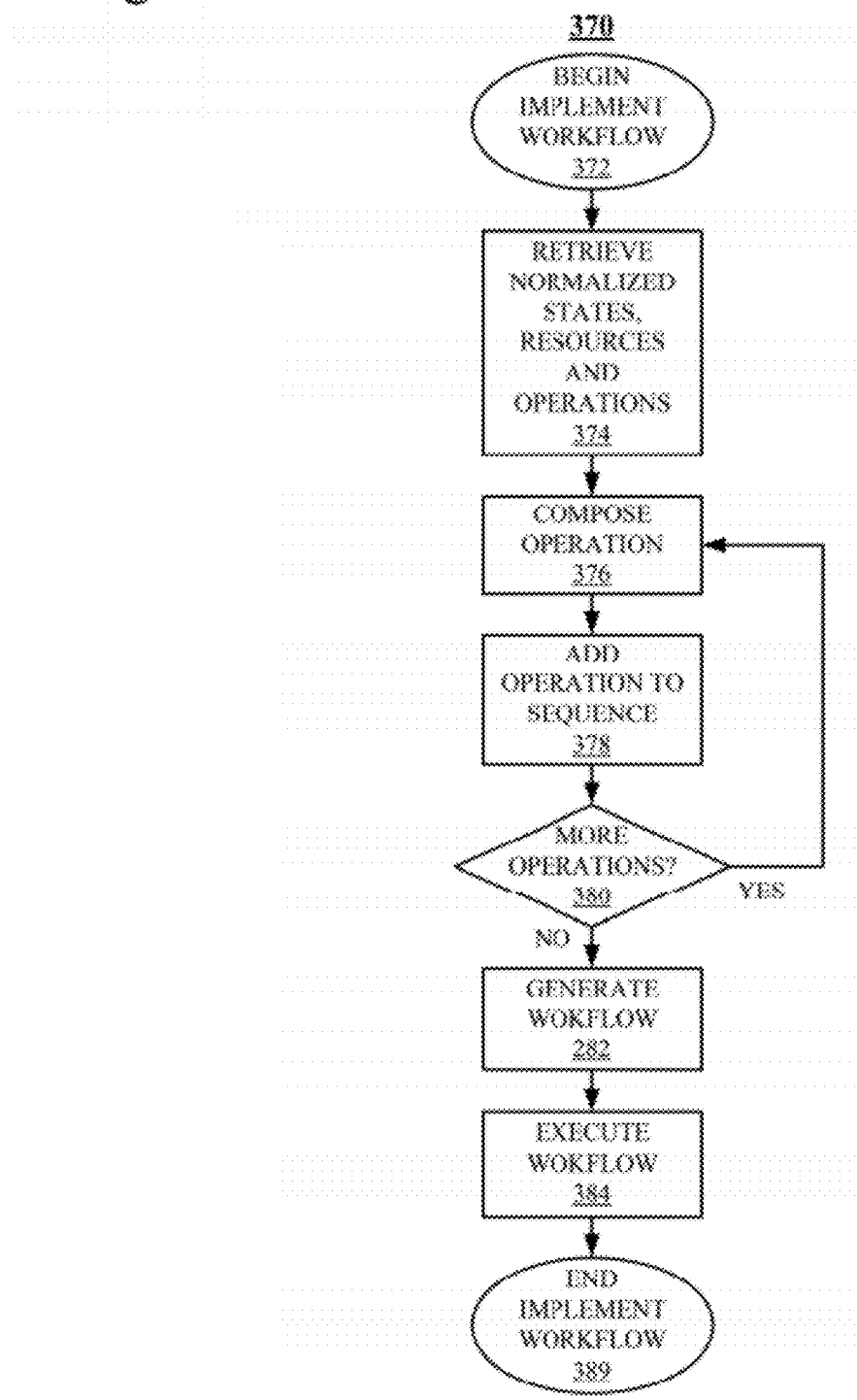
FIG. 14 is a flow chart of an Implement Operation Workflow process that may implement aspects the claimed subject matter.

During a "Store Normalized States, Resources and Operations" block 360, the information generated during processing associated with blocks 354, 356 and 358 is stored in management DB 145 for use during execution of RIOS 116 (see process 370, FIG. 14). It should be understood information generated and stored during processing associated with process 350 may be updated, augmented, extended, etc. based upon, but not limited to, such conditions as new information regarding architecture 100 or best practices that emerge during execution of RIOS 16. Finally, control proceeds to an "End Setup RIOS" block 369 in which process 350 is complete.

FIG. 14 is a flow chart of an Implement Operation Workflow process 370 that may implement aspects the claimed subject matter. In this example, logic associated with process 370 is stored in executable logic (see 142-149, FIG. 2) as part of RIOS 116 (FIGS. 1 and 2) and executed on CPU, or processor, 104 (FIG. 1) of management server 102 (FIG. 1).

Processing associated with process 370 starts in a "Begin Implement Workflow" block 372 and proceeds immediately to a "Retrieve Normalized States, Resources and Operations" block 374. During processing associated with block 374, data defining normalized states (see 354, FIG. 13), resources (see 356, FIG. 13) and operations (see 358, FIG. 13) are retrieved from DB 146 (FIG. 2). During processing associated with a "Compose Operation" block 376, an administrator defines a particular operation in terms of states, resources and operations retrieved during processing associated with block 374. During processing associated with an "Add Operation to Sequence" block 378, the operation composed during block 376 is inserted in a workflow, such as workflow 250 (FIGS. 10 and 12).

During processing associated with a "More Operations?" block 380, the administrator determines whether or not the workflow being assembled is complete. If not, control returns to Compose Operation block 376 and processing continues as describe above with the administrator composing any additional operations. If a determination is made that the workflow being assembled is complete, control proceeds to a "Generate Workflow" block 282 (see FIGS. 10-12). During block 282 the workflow is indicated as ready for execution and during processing associated with an "Execute Workflow" block 384 the workflow composed and assembled during processing associated with blocks 374, 376, 378, 380 and 382 is executed.

It should be noted that there is no requirement that a defined workflow generated in accordance with the disclosed technology be executed immediately once the composition and assembly is complete. Rather, the defined workflow may be stored in a CRSM and executed at multiple times in the future. In addition a defined workflow may be incorporated modified or incorporated into another workflow. Finally, process 370 processed to an "End Implement Workflow" block 389 during which process 370 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended, to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

I claim:

1. An apparatus, comprising:
   a processor;
   a computer-readable storage medium, coupled to the processor; and
   logic, stored on the computer-readable storage medium and executed on the processor, for:
      normalizing a set of infrastructure resource states to create a plurality of normalized infrastructure resource states;
      normalizing a set of infrastructure resources to create a plurality of normalized infrastructure resources, each normalized infrastructure resource corresponding to one of the normalized infrastructure resource states of the plurality of normalized infrastructure resource states;
      normalizing a set of operations for acting on the normalized set of infrastructure resources to create a plurality of normalized operations, wherein an input and an output corresponding to each normalized operation of the plurality of normalized operations has a defined type of a plurality of types;
      composing the normalized operations into an operational sequence such that the output of each normalized operation becomes the input of another normalized operation, wherein a defined type corresponding to each particular input matches a defined type corresponding to the corresponding output;
      generating a workflow plan as a named composition of normalized operations with well-defined operational semantics corresponding to the normalized infrastructure resource states, normalized infrastructure resources and normalized operations; and
      executing the workflow plan by evaluating and applying the well-defined semantics to the operational sequence.

2. The apparatus of claim 1. the logic further comprising logic for constraining the well-defined operational semantics based upon semantic objects drawn from best practice patterns.

3. The apparatus of claim 1, wherein each resource of the normalized infrastructure resources is either atomic or composed of other atomic or non-atomic resources.

4. The apparatus of claim 1, wherein each resource of the normalized infrastructure resources is an individual resource or a combination other infrastructure resources.

5. The apparatus of claim 1, wherein the plurality of infrastructure resources comprises server, storage, network and virtualization elements.

6. The apparatus of claim 1. the logic further comprising logic for generating a library of normalized, set of operations that is extendable by adding additional normalized operations.

7. A computer programming product, comprising:
   a non-transitory computer-readable storage medium; and
   logic, stored on the computer-readable storage medium for execution on a processor, for:
      normalizing a set of infrastructure resource states to create a plurality of normalized infrastructure resource states;
      normalizing a set of infrastructure resources to create a plurality of normalized infrastructure resources, each normalized infrastructure resource corresponding to one of the normalized infrastructure resource states of the plurality of normalized infrastructure resource states;
      normalizing a set of operations for acting on the normalized set of infrastructure resources to create a plurality of normalized operations, wherein an input and an output corresponding to each normalized operation of the plurality of normalized operations has a defined type of a plurality of types;
      composing the normalized operations into an operational sequence such that the output of each normalized operation becomes the input of another normalized operation, wherein a defined type corresponding to each particular input matches a defined type corresponding to the corresponding Output;
      generating a workflow plan as a named composition of normalized operations with well-defined operational semantics corresponding to the normalized infrastructure resource states, normalized infrastructure resources and normalized operations; and
      executing the workflow plan by evaluating and applying the well-defined semantics to the operational sequence.

8. The computer programming product of claim 7, the logic further comprising logic for constraining the well-defined operational semantics based upon semantic objects drawn from best practice patterns.

9. The computer programming product of claim 7, wherein each resource of the normalized infrastructure resources is either atomic or composed of other atomic or non-atomic resources.

10. The computer programming product of claim 7, wherein each resource of the normalized infrastructure resources is an individual resource or a combination other infrastructure resources.

11. The computer programming product of claim 7, wherein the plurality of infrastructure resources comprises server, storage, network and virtualization elements.

12. The computer programming product of claim 7, the logic farther comprising logic for generating a library of normalized set of operations that is extendable by adding additional normalized operations.

13. An apparatus, comprising:
a plurality of processors;
a computer-readable storage medium;
a set of infrastructure resources;
a normalized set of infrastructure resource states;
a set of operations; and
logic, stored on the computer-readable storage medium and executed on plurality of processors, for:
normalizing the set of infrastructure resources to create a plurality of normalized infrastructure resources by correlating each infrastructure resources to one of the normalized infrastructure resource states of the plurality of normalized infrastructure resource states;
normalizing the set of operations for acting on the normalized set of infrastructure resources to create a plurality of normalized operations by correlating an input and an output corresponding to each normalized operation of the plurality of normalized operations to a defined type of a plurality of types;
composing the set or normalized operations into an operational sequence such that the output of each normalized operation becomes the input of another normalized operation, wherein a defined type corresponding to each particular input matches a defined type corresponding to the corresponding output;
generating a workflow plan as a named composition of normalized operations with well-defined operational semantics corresponding to the normalized infrastructure resource states, normalized infrastructure resources and normalized operations; and
executing the workflow plan by evaluating and applying the well-defined semantics to the operational sequence.

14. The apparatus of claim 13, the logic further comprising logic for constraining the well-defined operational semantics based upon semantic objects drawn from best practice patterns.

15. The apparatus of claim 13, wherein each resource of the normalized infrastructure resources is either atomic or composed of other atomic or non-atomic resources.

16. The apparatus of claim 13, wherein each resource of the normalized infrastructure resources is an individual resource or a combination other infrastructure resources.

17. The apparatus of claim 13, wherein the plurality of infrastructure resources comprises server, storage, network, and virtualization elements.

18. The apparatus of claim 13, the logic further comprising logic for generating a library of normalized set of operations that is extendable by adding additional normalized operations.

* * * * *